United States Patent Office 3,584,031
Patented June 8, 1971

3,584,031
DIESTER PRODUCTION USING ALKYLENE IMINE POLYMERS AS CATALYSTS
Preston K. Martin and Donald R. Larkin, Corpus Christi, Tex., assignors to Celanese Corporation, New York, N.Y.
No Drawing. Filed Apr. 19, 1968, Ser. No. 722,540
Int. Cl. C07c 69/82
U.S. Cl. 260—475                                           13 Claims

ABSTRACT OF THE DISCLOSURE

Process for the production of bis-hydroxyalkyl esters of benzene dicarboxylic acid by reacting the diacid with an alkylene oxide utilizing a catalyst which is a polymer of an alkylene imine, for example, polyethyleneimine.

BACKGROUND OF THE INVENTION

The present invention relates to the production of bis-hydroxyalkyl esters of benzene dicarboxylic acids. More particularly the present invention relates to the production of bis-hydroxyalkyl esters of benzene dicarboxylic acids by reacting a benzene dicarboxylic acid, such as terephthalic acid, with an alkylene oxide, such as ethylene oxide, in the presence of a novel catalyst.

The production of bis-hydroxyalkyl esters of benzene dicarboxylic acids, such as bis(2-hydroxyethyl) terephthalate, has become of significant commercial importance in recent years because these diesters may be polymerized to form the linear super polyesters. These polyesters such as polyethylene terephthalate are widely used in textiles, tire cord, and the like. Probably the best known and most widely used method for producing these bis-hydroxyalkyl esters is by suspending the benzene dicarboxylic acid in an inert liquid medium and reacting the diacid with an alkylene oxide in the presence of a catalyst. Various catalysts and reaction media have been reported in the literature for effecting such a reaction. For example such patents as U.S. Pat. 3,037,049, British Pats. 999,242; 1,019,669; Netherlands 6,506,220; 6,601,077, German 1,157,623, French Pats. 1,430,842; 1,415,134; Belgian Pats. 660,257; 666,527 and Japanese Pat. 26,341/65 disclose the use of such reaction media as water, cyclic ethers such as dioxane, ketones, hydrocarbons, halohydrocarbons, nitriles, alcohols, esters such as butyl acetate, and dimethylformamide-water mixtures. These patents also disclose catalysts including quaternary ammonium compounds such as benzyltriethyl ammonium chloride, triethylamine, trimethylphosphine, triethylarsine, tributylstibine, and the chlorides, sulfates or nitrates of alkali metals. It is apparent from the foregoing that many catalysts are known for reacting benzene dicarboxylic acid with alkylene oxides, however, in view of the commercial importance of polyesters, research is constantly underway for new and efficient catalysts.

SUMMARY

It is thus an object of the present invention to provide a process for the production of bis-hydroxyalkyl esters of benzene dicarboxylic acids. It is also an object of the present invention to provide a novel and efficient catalyst for a process wherein a benzene dicarboxylic acid is reacted with an alkylene oxide so as to produce a bis-hydroxyalkyl ester of a benzene dicarboxylic acid, particularly bis(2-hydroxyethyl) terephthalate. Additional objects will become apparent from the following description.

These and other objects are accomplished by the present invention which in one of its embodiments is a process for the production of bishydroxyalkyl esters of benzene dicarboxylic acids by reacting a benzene dicarboxylic acid suspended in an inert liquid reaction medium with an alkylene oxide in the presence of a catalyst which is a polymer of an alkylene imine, said polymer having a molecular weight of at least 500.

DESCRIPTION OF THE PREFERRED EMBODIMENTS

As may be seen from the above summary, the catalysts of the present invention are polymers of alkylene imines such as polyethyleneimine. These liquid or solid polymers of alkylene imines are well known and are widely used for such purposes as the manufacture of adhesives, as flocculants in water treatment, and the like. These polymers are commercially available under such trademarks as Dow Chemical Company's Montrek 600 and Montrek 600E. For a review of various methods of polymerizing alkylene imines attention is directed to an article by G. D. Jones in Chapter 14 of "The Chemistry of Cationic Polymerization," P. H. Plesch, Editor, MacMillan Company, New York, 1963, wherein the polymerization of alkylene imines is thoroughly reviewed. The polymeric alkylene imines, or olefin imines as they are sometimes called, should have a molecular weight of from about 500–150,000, preferably about 1500 to 120,000. These polymers in general should be formed by polymerizing those alkylene imines having from about 2–6 carbon atoms although polymers of ethylene imines are much preferred over the others. Some other monomeric imines which may be polymerized to produce the catalyst of the present invention include N-methylethyleneimine, 2-methylethyleneimine, cis-2,3-dimethylethyleneimine, and the like. The polymers of olefin imines which are useful as catalysts in the present invention are not limited to merely the homopolymers, such as polyethyleneimine, but may also be the well known reaction products of these homopolymers with other agents. For example, polyethyleneimine may be easily reacted with an alkylene oxide in aqueous solution so as to alkoxylate it or may be reacted with a carbonyl compound such as formaldehyde so as to add a hydroxyalkyl group. As was pointed out above these reaction products of polymeric alkylene imines with other agents such as alkylene oxides and carbonyl compounds are well known, e.g. see British Pats. 466,270; 466,344; 466,345 and 466,346, and therefore the manner of preparing these polymers does not constitute a part of the present invention. Also useful as catalysts in the present process are polymers of olefin imines that have been quaternized such as by reacting polyethyleneimine with an alkyl halide such as methyl iodide or ethyl bromide, followed by a caustic treatment to replace the halide ion with a hydroxyl ion.

Although various other adducts, reaction products, etc. of alkylene imine polymers are known in addition to those specifically mentioned above, it is generally preferred to use those that have been specifically mentioned. In other words homopolymers of alkylene imines, reaction products of alkylene oxides with alkylene imine homopolymers, reaction products of alkylene imine homopolymers with alkyl carbonyl compounds, or quaternized homopolymers of alkylene imines give best results. By alkylene oxide is meant those vicinal epoxide compounds, preferably those containing 2–6 carbon atoms such as ethylene oxide and 1,2-propylene oxide. By alkyl carbonyl compounds is meant the aldehydes and ketones such as formaldehyde, acetone and acetaldehyde with those containing 1 to 4 carbon atoms being preferred. The especially preferred catalysts of the present invention are the homopolymers of ethylene imines, i.e. polyethyleneimine, or the reaction products of polyethyleneimine with an alkylene oxide, e.g. a hydroxyethylated polyethyleneimine.

In using the polymeric catalysts of the present invention it is generally desirable to use them in amounts of from about 0.2 to 10.0 percent by weight based on the weight of the benzene dicarboxylic acid being used, preferably in amounts of from about 1.5 to 6.0 weight percent based on the weight of the benzene dicarboxylic acid reactant. Many of the commercially available polymers of alkylene imines, particularly polyethyleneimine, are sometimes supplied as aqueous solutions and therefore are not suitable to be used directly when an organic reaction medium such as xylene is being utilized. In such cases the water may be removed by various manners but one useful technique is to add a portion of the benzene dicarboxylic acid to the aqueous solution of the polymeric imine so as to form a salt, followed by removal of the water on a rotary evaporator or similar device or by azeotropic removal of the water with cyclohexane, benzene, toluene, etc. The recovered salt of the polymeric imine may then be added as the source of the catalyst without any difficulty as it appears that these polymeric catalysts of the present invention form salts with the benzene dicarboxylic acid in situ in the reaction medium.

The process of the present invention may be conducted in various manners and may be conducted as a batch process or as a continuous process. The benzene dicarboxylic acids utilized in the present invention are generally very insoluble materials and therefore in conducting the process the benzene dicarboxylic acid, preferably in a finely divided form, is suspended by agitation in from about 1.0 to 15.0, preferably 2.5 to 10.0 times its weight of the reaction medium and then reacted with the alkylene oxide in the presence of the novel catalyst of the present invention. The bis-hydroxyalkyl diester product, unlike the dibasic acid starting material, is quite soluble in the reaction medium under the reaction conditions and therefore will generally be entirely soluble in the reaction medium when sufficient amounts of the reaction medium are being used. The temperatures to be used in the present invention may vary from about 80 to 200° C. but are preferably from about 130 to 175° C. The pressures may range from superatmospheric to subatmospheric, the only requirement being that the pressure be sufficient to maintain a liquid phase of the liquid reaction medium. Generally the pressure will be from about 1 to 30 atmospheres, however. The residence time of the reactants in the reaction zone will usually be about 2 to 180 minutes.

The alkylene oxides usually should be present in amounts of from about 1.7 to 5 moles per mole of the dicarboxylic acid and is preferably present in amounts of from about 2 to 4 moles per mole of the dicarboxylic acid. The alkylene oxide used as a reactant in the present process is preferably ethylene oxide while the preferred dicarboxylic acid is terephthalic acid although the present invention is not to be construed as limited thereto. Suitable alkylene oxides include those vicinal epoxides having from 2 to 6 carbon atoms such as 1,2-propylene oxide and 1,2-butylene oxide while other benzene dicarboxylic acids that may be used include o-phthalic acid and isophthalic acid. Mixtures of the alkylene oxides and/or mixtures of the dicarboxylic acids may also be used in the present invention.

The particular method for separating the bis-hydroxyalkyl esters from the effluent of the reaction zone does not constitute a part of the present invention and various methods will be apparent to those skilled in the art. The effluent will usually be comprised of alkylene oxide, unreacted solid dicarboxylic acid, the liquid reaction medium being used, and the soluble diester product. Such an effluent can be treated for example by first flashing the alkylene oxide followed by removal of the solid diacid by filtration, and finally the cooling of the remaining diester solution so as to crystallize the diester product. The crystallized diester can then of course be removed by filtration with or without washing, or the like. When crystallizing a bis-hydroxyalkyl ester of a benzene dicarboxylic acid from solution in the liquid medium, the particular temperature to which the solution is cooled to effect crystallization is readily determined and will vary according to the particular diester being used and the particular liquid medium being used. For example when crystallizing bis(2 - hydroxyethyl)terephthalate from chlorobenzene it is preferred to cool the solution to below 30° C. and preferably below 20° C. in order to insure optimum recovery of the diester. Following recovery of the diester it may be treated in various manners to remove residual impurities. For example it may be recrystallized from aqueous solution so as to remove nitrogen type impurities.

Inert reaction mediums for the present invention are well known but in general it might be stated that the reaction medium is one which does not undergo reaction with the reactants or undergo decomposition under the process conditions. Preferably the reaction medium is one which comprises an organic compound, i.e. an organic compound or mixtures of an organic compound with water. As has been pointed out above reaction media such as cyclic ethers, ketones, hydrocarbons, water, halohydrocarbons, alkyl esters of alkanoic acids and the like are reported in the literature. Also useful are the 2-alkyl dioxolane and 2,2-dialkyl dioxolane reaction media disclosed in copending U.S. application Ser. No. 718,226 filed Apr. 2, 1968, in the name of Enrique R. Witt et al., as well as the nitrobenzene and nitrotoluene reaction media disclosed in Donald R. Larkin's copending U.S. application Ser. No. 705,937 filed Feb. 16, 1968. The preferred liquid reaction medium to be used in the present invention is a hydrocarbon or a halohydrocarbon. Of the hydrocarbons the alkyl benzenes such as xylene, ethylbenzene, toluene, and cumene are preferred. Of the chlorohydrocarbons, preferred are the chloroalkanes and chloroaromatics free of ethylenic and acetylenic unsaturation such as 1,1,2-trichloroethane, chlorobenzene, and p-chlorotoluene.

The following examples are given in order to illustrate specific embodiments of the present invention.

EXAMPLE I

A catalyst is prepared from Montrek 600E by mixing 24 grams of the material with 19.5 grams of terephthalic acid as well as 30 milliliters of water so that good mixing can be obtained. After stirring the mixture for about 1 hour it is placed on a rotary film evaporator for the removal of the water and a thick solid recovered which is the terephthalic acid salt of the hydroxyethylated polyethyleneimine. Montrek 600E is Dow Chemical Company's designation for a 40% aqueous solution of hydroxyethylated polyethyleneimine which is prepared by reacting polyethyleneimine having a molecular weight of about 40,000 to 60,000 with ethylene oxide.

EXAMPLE II

A 3-liter stirred autoclave is charged with 600 grams (3.6 moles) of fiber grade terephthalic acid, 1600 milliliters chlorobenzene, 12.4 grams of the terephthalic acid salt of hydroxyethylated polyethyleneimine as prepared in Example I, and then purged with nitrogen. Liquid ethylene oxide (8.6 moles) is then pumped in and the reactor heated to 175° C. by passing steam through internal coils. The temperature is maintained at 175° C. for about 30 minutes with the pressure varying during the period from about 215 p.s.i.g. at the beginning of the period to 80 p.s.i.g. at the end of the period. After the thirty minutes is up, the reaction is terminated by pressuring the contents of the autoclave into a vessel where ethylene oxide is flashed and then the unreacted terephthalic acid and other solids removed by filtration. Cooling of the filtrate to about 30° C. gives about 760 grams of bis(2-hydroxyethyl) terephthalate (dry basis). Conversion of the terephthalic acid charged to the diester product is about 91 mole percent.

EXAMPLE III

The procedure of Example II is repeated except that the catalyst used is about 27 grams of Montrek 18. Montrek 18 is an anhydrous polyethyleneimine having molecular weight of about 1800. Also in this experiment the temperature is maintained at about 140° C. for 45 minutes with the pressure maintained constant at about 200 p.s.i.g. The bis(2-hydroxyethyl) terephthalate product recovered is about 700 grams on a dry basis.

The embodiments of the invention in which an exclusive property or privilege is claimed are defined as follows:

1. A process for the production of bishydroxyalkyl esters of benzene dicarboxylic acids comprising reacting a benzene dicarboxylic acid suspended in an inert liquid reaction medium with a vicinal epoxide having from 2–6 carbon atoms in the presence of a catalyst which is a polymer of an alkylene imine, said polymer having a molecular weight of from 500–150,000, and said alkylene amine having from 2–6 carbon atoms.

2. The process of claim 1 wherein terephthalic acid is reacted with ethylene oxide so as to produce bis(2-hydroxyethyl) terephthalate.

3. The process of claim 1 wherein the reaction medium is an alkylbenzene or a halohydrocarbon free of ethylenic and acetylenic unsaturation.

4. The process of claim 1 wherein said polymer of an alkylene imine is a homopolymer, a reaction product of a homopolymer of an alkylene imine with an alkylene oxide, a reaction product of a homopolymer of an alkylene imine with an alkyl carbonyl compound, or a quaternized polymer of an alkylene imine.

5. The process of claim 1 wherein said polymer has a molecular weight of 1500 to 120,000.

6. The process of claim 1 wherein said alkylene imine is ethylene imine.

7. The process of claim 6 wherein said catalyst is polyethyleneimine.

8. The process of claim 6 wherein the catalyst is hydroxyethylated polyethyleneimine.

9. The process of claim 7 wherein the inert reaction medium is a hydrocarbon or a halohydrocarbon.

10. The process of claim 7 wherein terephthalic acid is reacted with ethylene oxide so as to produce bis(2-hydroxyethyl) terephthalate.

11. The process of claim 10 wherein the ethylene oxide is present in amounts of from about 1.7 to 5.0 moles per mole of terephthalic acid.

12. The process of claim 10 wherein the temperature is from about 80 to 200° C.

13. The process of claim 10 wherein the molecular weight of the polymer is from about 1500 to 120,000.

References Cited

UNITED STATES PATENTS

| | | | |
|---|---|---|---|
| 3,414,608 | 12/1968 | Fujita et al. | 260—475 |
| 3,459,788 | 8/1969 | Enoki et al. | 260—475 |

CHARLES B. PARKER, Primary Examiner

E. J. SKELLY, Assistant Examiner